No. 669,184. Patented Mar. 5, 1901.
E. ROLLINGS.
NUT LOCK.
(Application filed Aug. 26, 1899.)

(No Model.)

Witnesses
W. C. Lunsford
C. E. Brock

Inventor
E. Rollings
by
Attorneys

THE NORRIS PETERS CO., PHOTO-LITHO., WASHINGTON, D. C.

UNITED STATES PATENT OFFICE.

EDWARD ROLLINGS, OF JACOB'S CREEK, PENNSYLVANIA.

NUT-LOCK.

SPECIFICATION forming part of Letters Patent No. 669,184, dated March 5, 1901.

Application filed August 26, 1899. Serial No. 728,571. (No model.)

*To all whom it may concern:*

Be it known that I, EDWARD ROLLINGS, a citizen of the United States, residing at Jacob's Creek, in the county of Westmoreland and State of Pennsylvania, have invented a certain new and useful Nut-Lock, of which the following is a specification.

My invention relates to nut-locks; and the object thereof is to provide a cheap, simple, and durable nut-lock which can be attached to the ordinary fish-plate without materially altering the same; and with this object in view my invention consists in providing one of the fish-plates at each end with a recess adapted to receive the head of a bolt and having an opening communicating therewith, providing a bar (shaped on its inner surface to conform to the fish-plate, so as to lie snugly thereon) with a series of openings to correspond to the number of nuts on the securing-bolts, which hold the fish-plates together, and an opening at each end and passing a bolt through the fish-plate and bar and securing the same thereto by a split pin.

To more fully describe my invention, reference should be had to the accompanying drawings, in which—

Figure 1:
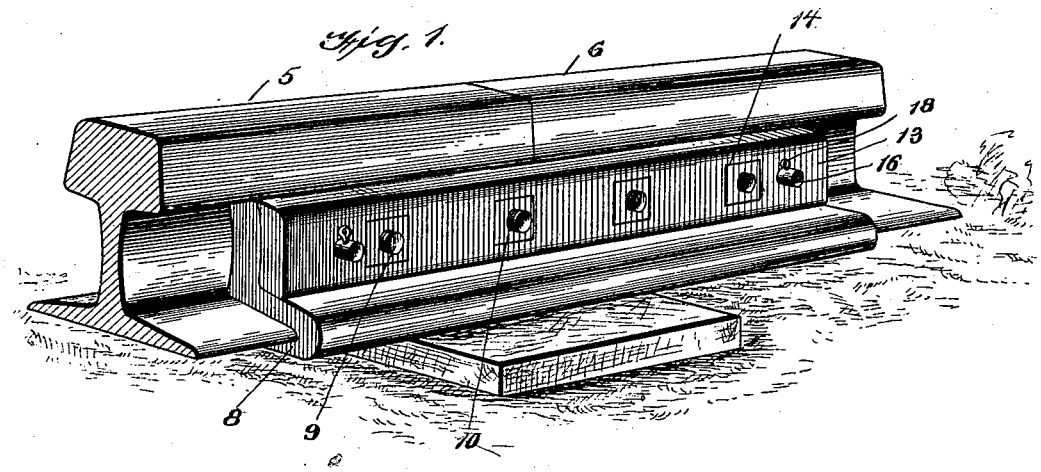
Figure 2:
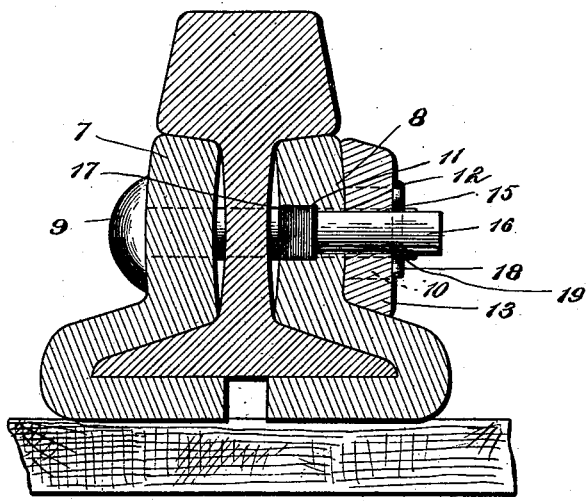
Figure 3:
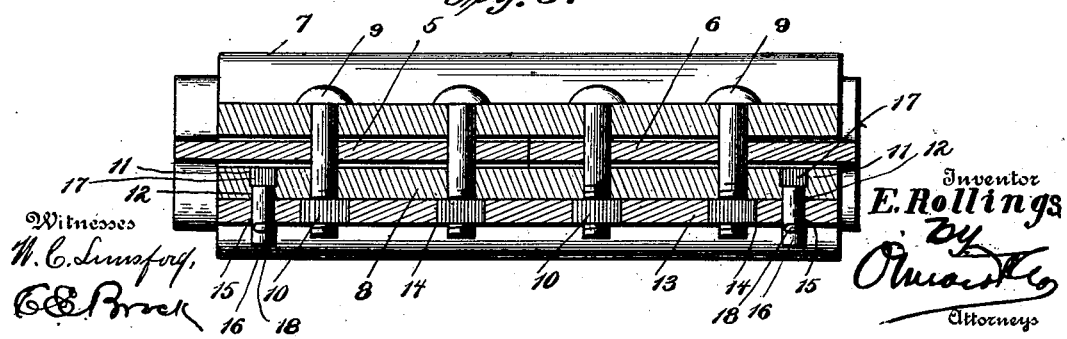

Figure 1 represents a perspective view of my invention applied. Fig. 2 is a transverse section through a rail and fish-plates to which my invention has been applied, and Fig. 3 is a transverse longitudinal section through the same.

Referring now to the drawings by reference-numerals, 5 and 6 indicate rails of ordinary construction, the ends of which are connected by means of fish-plates 7 and 8, secured thereto by means of bolts 9, on the ends of which are nuts 10. The fish-plate 8 is provided with a recess or countersink 11 at each end, and extending through this plate and communicating with the recesses 11 are openings 12.

13 is a longitudinally-arranged bar of metal having openings 14 corresponding to the same general shape of the nuts 10, and the under surface of this bar 13 is curved to conform to the shape of the outer surface of the fish-plate 8, whereby it is adapted to lie snugly thereagainst.

15 represents openings in each end of this bar 13 and designed to coincide with the openings 12.

16 represents bolts, the heads 17 of which rest in the recesses 11 of the fish-plate 8, and the shanks thereof project through the openings 12 of the fish-plate and through openings 15 in the bar 13, whereby said bar is secured to the fish-plate by the split pins 18, passing through openings 19 in the ends of the bolts 16. It will thus be seen that an ordinary fish-plate may readily be fitted out with my nut-lock without materially altering the construction thereof.

Having thus fully described my invention, what I claim as new, and desire to secure by Letters Patent of the United States, is—

In a nut-lock, the combination with fish-plates positioned on opposite sides of the rails and having bolts passing therethrough and through the rails and projecting through one of the fish-plates and receiving nuts on the projecting ends thereof, of a plate or bar placed in contact with the fish-plate and having openings of a size to receive said nuts and hold the same from movement, said bar contacting at its lower edge throughout its length with the base of the fish-plate, and formed at each end with openings, said fish-plate formed with openings in line with the openings of the bar, and with recesses at the inner ends of said openings, bolts extending through the openings of the fish-plate and bar and projecting from the latter, and having heads fitting in the recesses of the fish-plate, and securing means engaging the projecting ends of the bolts, substantially as described.

EDWARD ROLLINGS.

Witnesses:
S. H. SMITH,
CHAS. PFLUGER.